United States Patent
Long et al.

(10) Patent No.: US 9,246,751 B2
(45) Date of Patent: Jan. 26, 2016

(54) ETHERNET RING PROTECTION SWITCHING METHOD, NETWORK DEVICE AND SYSTEM

(71) Applicant: Huawei Technologies Co., Ltd., Shenzhen, Guangdong (CN)

(72) Inventors: Hao Long, Chengdu (CN); Rong Xie, Chengdu (CN); Xiaojun Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 13/892,796

(22) Filed: May 13, 2013

(65) Prior Publication Data

US 2013/0286818 A1 Oct. 31, 2013

Related U.S. Application Data

(63) Continuation of application No. PCT/CN2012/074927, filed on Apr. 28, 2012.

(51) Int. Cl.
*H04L 12/28* (2006.01)
*H04L 12/24* (2006.01)
*H04L 12/437* (2006.01)

(52) U.S. Cl.
CPC .......... *H04L 41/0654* (2013.01); *H04L 12/437* (2013.01); *H04L 41/0663* (2013.01)

(58) Field of Classification Search
USPC .............. 370/222, 252, 322, 395.53
See application file for complete search history.

(56) References Cited

U.S. PATENT DOCUMENTS

2009/0316571 A1 12/2009 Rose
2010/0188970 A1* 7/2010 Fujii et al. ............ 370/222
(Continued)

FOREIGN PATENT DOCUMENTS

CN 1642128 A 7/2005
CN 101232428 A 7/2008
(Continued)

OTHER PUBLICATIONS

"Series G: Transmission Systems and Media, Digital Systems and Networks; Packet over Transport aspects—Ethernet over Transport aspects; Series Y: Global Information Infrastructure, Internet Protocol Aspects and Next-Generation Networks—Ethernet Ring Protection Switching," G.8032/Y.1344, International Telecommunication Union (Feb. 2012).
(Continued)

*Primary Examiner* — Zewdu A Beyen
(74) *Attorney, Agent, or Firm* — Leydig, Voit & Mayer, Ltd.

(57) ABSTRACT

Embodiments of the present disclosure provide an Ethernet ring protection switching method, network device and system. In the embodiments of the present disclosure, a node obtains bandwidth information of a first link on an Ethernet ring on which the node is located, and determines that bandwidth of the first link changes, where there is at least one Ethernet ring protection instance on the Ethernet ring, and then the node determines ports of the node, where the at least one Ethernet ring protection instance passes through the ports, so that the node can query pre-configured correspondence between bandwidth information and switching information of each link on the Ethernet ring, and execute, through the ports of the node, a switching operation corresponding to the bandwidth information of the first link.

8 Claims, 4 Drawing Sheets

(56) References Cited

U.S. PATENT DOCUMENTS

| | | |
|---|---|---|
| 2012/0163224 A1 | 6/2012 | Long |
| 2013/0077474 A1 | 3/2013 | Long |

FOREIGN PATENT DOCUMENTS

| | | | |
|---|---|---|---|
| CN | 101272310 A | 9/2008 | |
| CN | 101640646 A | 2/2010 | |
| CN | 101645797 A | 2/2010 | |
| CN | 101977130 A | 2/2011 | |
| CN | 102271048 A | 7/2011 | |
| CN | 102148801 A | 8/2011 | |
| CN | 102307132 A | 1/2012 | |
| EP | 2352253 A1 | 8/2011 | |

OTHER PUBLICATIONS

Shah et al., "Extreme Networks' Ethernet Automatic Protection Switching (EAPS)," Version 1, Network Working Group, The Internet Society (Oct. 2003).

"Ethernet Ring Protection Switching," Series G: Transmission Systems and Media, Digital Systems and Networks—Packet over Transport aspects—Ethernet over Transport aspects; Series Y: Global Information Infrastructure, Internet Protocol Aspects and Next-Generation Networks, Recommendation ITU-T G.8032/Y.1344, International Telecommunication Union (Feb. 2012).

* cited by examiner

ETHERNET RING PROTECTION SWITCHING METHOD, NETWORK DEVICE AND SYSTEM

CROSS-REFERENCE TO RELATED APPLICATIONS

This application is a continuation of International Patent Application No. PCT/CN2012/074927, filed on Apr. 28, 2012, which is hereby incorporated by reference in its entirety.

FIELD

The present disclosure relates to communications technologies, and in particular to an Ethernet ring protection switching method, network device and system.

BACKGROUND

To ensure the reliability of a network link, a ring automatic protection switching (Ring Automatic Protection Switching, R-APS) protocol is generally used to perform switching on a failed link in an Ethernet ring, and therefore, the protection for an Ethernet service is implemented. One or more Ethernet ring protection (Ethernet Ring Protection, ERP) instances may be configured on one Ethernet ring. In each ERP instance, at least one link is set as a backup link, that is, a ring protection link (Ring Protection Link, RPL). When the ERP instance is in a normal working status, the RPL is in a blocked status, that is, ports that are on a node at any end of the RPL and participate in the ERP instance are blocked. When a certain segment of a link or a certain node that participates in the ERP instance is failed, the blocked ports may be opened and service transmission may be performed through the RPL.

However, in a conventional ring protection switching method, ring protection switching can only be triggered in a case of link failure or manual forced switching, and the ring protection switching is not flexible.

SUMMARY

Embodiments of the present disclosure provide an Ethernet ring protection switching method, network device and system, which are used to improve flexibility of ring protection switching.

In one aspect, an Ethernet ring protection switching method is provided and includes:

obtaining, by a node, bandwidth information of a first link on an Ethernet ring on which the node is located, and determining that bandwidth of the first link changes, where there is at least one ERP instance on the Ethernet ring;

determining, by the node, ports of the node, where the at least one ERP instance passes through the ports; and querying, by the node, pre-configured correspondence between bandwidth information and switching information of each link on the Ethernet ring, and executing, through the ports of the node, a switching operation corresponding to the bandwidth information of the first link.

In another aspect, a computer program product is provided and includes computer program codes, where when a processing unit executes the computer program codes, the processing unit executes actions recorded in the foregoing Ethernet ring protection switching method.

In another aspect, a network device is provided and includes:

a receiver, configured to obtain bandwidth information of a first link on an Ethernet ring on which the network device is located, where there is at least one ERP instance on the Ethernet ring;

a determining unit, configured to determine that bandwidth of the first link changes, and determine ports of the network device, where the at least one ERP instance passes through the ports; and an operating unit, configured to query pre-configured correspondence between bandwidth information and switching information of each link on the Ethernet ring, and execute, through the ports of the network device, a switching operation corresponding to the bandwidth information of the first link.

In another aspect, an Ethernet ring protection switching system is provided and includes the foregoing network device, and further includes another network device, configured to send a bandwidth information packet to the network device, where the bandwidth information packet carries the bandwidth information of the first link.

It may be known from the foregoing technical solutions that in the embodiments of the present disclosure, the node obtains the bandwidth information of the first link on the Ethernet ring on which the node is located, and determines that the bandwidth of the first link changes, where there is at least one ERP instance on the Ethernet ring, and then the node determines the ports of the node, where the at least one ERP instance passes through the ports, so that the node can query the pre-configured correspondence between the bandwidth information and the switching information of each link on the Ethernet ring, and executes, through the ports of the node, the switching operation corresponding to the bandwidth information of the first link, which can solve a problem in the prior art that ring protection switching can only be triggered in a case of link failure or manual forced switching, thereby improving the flexibility of the ring protection switching.

BRIEF DESCRIPTION OF THE DRAWINGS

To illustrate the technical solutions in the embodiments of the present disclosure more clearly, the following briefly introduces the accompanying drawings required for describing the embodiments. The accompanying drawings in the following description are merely some embodiments of the present disclosure, and persons of ordinary skill in the art may further obtain other drawings according to these accompanying drawings without making creative efforts.

DETAILED DESCRIPTION OF THE EMBODIMENTS

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without making creative efforts shall fall within the protection scope of the present disclosure.

In a network formed by nodes, multiple ERP instances may pass through one node, and there may also be multiple ports on the node. In the description of the present disclosure, only one of such nodes, along with ports and a link that belong to the node are described. The technical solutions provided in the present disclosure may also be adopted for a link or ports of another node, where a same ERP instance passes through the link or ports, which also falls within the consideration scope of the Ethernet ring protection switching method. The embodiments of the present disclosure may be applied to any node on a same Ethernet ring, that is, the node may be any node on the same Ethernet ring. In the description of the present disclosure, the link is a physical link, and may also be a logical link. Bandwidth of the link may be bandwidth of a physical link or a logical link where the node is located.

An ERP instance is used to protect a virtual local area network (Virtual Local Area Network, VLAN) in a physical Ethernet ring. Each ERP instance is independent of one or more other ERP instances configured on the Ethernet ring. A protection mechanism described in an R-APS protocol may independently apply to each ERP instance.

Figure 1:
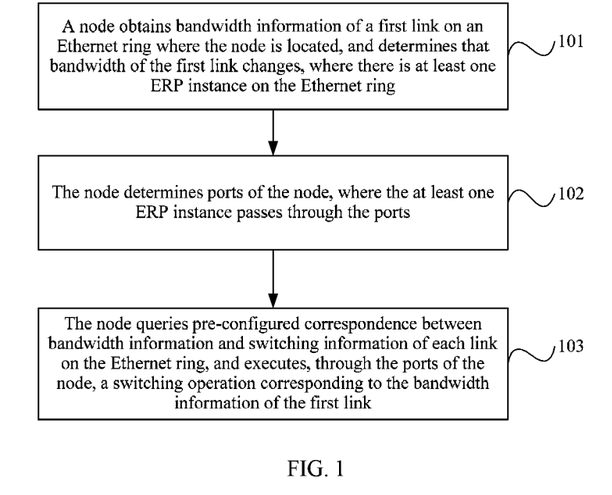
FIG. 1 is a schematic flow chart of an Ethernet ring protection switching method according to an embodiment of the present disclosure.

FIG. 1 is a schematic flow chart of an Ethernet ring protection switching method according to an embodiment of the present disclosure. As shown in FIG. 1, the Ethernet ring protection switching method in this embodiment may include:

Step 101: A node obtains bandwidth information of a first link on an Ethernet ring where the node is located, and determines that bandwidth of the first link changes, where there is at least one ERP instance on the Ethernet ring.

Multiple ERP instances may be configured on one Ethernet ring. A transmission route of a service may be optimized by configuring blocking positions of different ports. In another aspect, performance of a service transmitted on the Ethernet ring may be ensured by limiting bandwidth resources of each ERP instance.

The bandwidth information of the first link may be bandwidth information corresponding to a physical link, and may also be bandwidth information corresponding to a logical link.

Optionally, in an optional implementation of this embodiment, the change in bandwidth may be bandwidth degradation. For example, the bandwidth degradation may occur in the following situations: (1) the link is a microwave link, and when adaptive modulation occurs to a microwave device, a bandwidth change is caused; (2) the link is a link aggregation group (Link Aggregation Group, LAG), and when a group member of the LAG is failed, a bandwidth change is caused.

Step 102: The node determines ports of the node, where the at least one ERP instance passes through the ports.

Step 103: The node queries pre-configured correspondence between bandwidth information and switching information of each link on the Ethernet ring, and executes, through the ports of the node, a switching operation corresponding to the bandwidth information of the first link.

The ports of the node, where the at least one ERP instance passes through the ports, refer to virtual ports corresponding to each ERP instance.

The bandwidth information of each link on the Ethernet ring may be bandwidth information corresponding to a physical link, and may also be bandwidth information corresponding to a logical link.

The bandwidth information of each link on the Ethernet ring may include, but is not limited to, at least one type of the following information: bandwidth information of another link on the node; bandwidth information of a link on another node that is sent by the another node and is received; and bandwidth information of a link on another node that is stored in a ring network bandwidth database of the node.

The first link may be a link where the node is located, or may also be another link on the Ethernet ring, which is not limited in this embodiment.

Optionally, in an optional implementation of this embodiment, the node is an end node of the first link, and before step 101, the node may further detect the bandwidth of the first link to obtain the bandwidth information of the first link on the Ethernet ring where the node is located.

Optionally, in an optional implementation of this embodiment, in step 101, the node may receive a bandwidth information packet sent by an end node of the first link, where the bandwidth information packet carries the bandwidth information of the first link.

The bandwidth information packet may further include link position information, where the link position information may include node information or a combination of node information and port information. For example, the bandwidth information packet may be an R-APS protocol message.

Optionally, in an optional implementation of this embodiment, before step 103, the node may further store the correspondence between the bandwidth information and the switching information of each link on the Ethernet ring, where the correspondence between the bandwidth information and the switching information of each link on the Ethernet ring may include the following:

correspondence between a bandwidth value and a bandwidth index of each link on the Ethernet ring;

correspondence between the bandwidth index and the at least one ERP instance; and correspondence between the at least one ERP instance and a switching operation that needs to be executed through the ports of the node.

It may be understood that there may be many configuration principles of the switching information. For example, selecting a link with high bandwidth as a working link, which can make full use of an idle bandwidth on a backup link, improves utilization efficiency of a network bandwidth, and maximizes service capacity of the Ethernet ring.

It may be understood that the switching information includes port blocking and port opening. The port blocking refers to forbidding data traffic from passing through the port, and is generally implemented by setting the filtering of a forwarding table. There are other manners of implementation, for example, directly closing the port, which is not limited in this embodiment.

In this embodiment, the node obtains the bandwidth information of the first link on the Ethernet ring where the node is located, and determines that the bandwidth of the first link changes, where there is at least one ERP instance on the Ethernet ring, and then the node determines the ports of the node, where the at least one ERP instance passes through the ports, so that the node can query the pre-configured correspondence between the bandwidth information and the switching information of each link on the Ethernet ring, and executes, through the ports of the node, the switching operation corresponding to the bandwidth information of the first link, which can solve a problem in the prior art that ring protection switching can only be triggered in a case of link failure or manual forced switching, thereby improving flexibility of ring protection switching. By adopting the technical solution provided in the present disclosure, if bandwidth of a link on the Ethernet ring changes, a backup link with a higher bandwidth can be used for data transmission, which can effectively ensure that the service capacity of the Ethernet ring is maximized.

Figure 2:
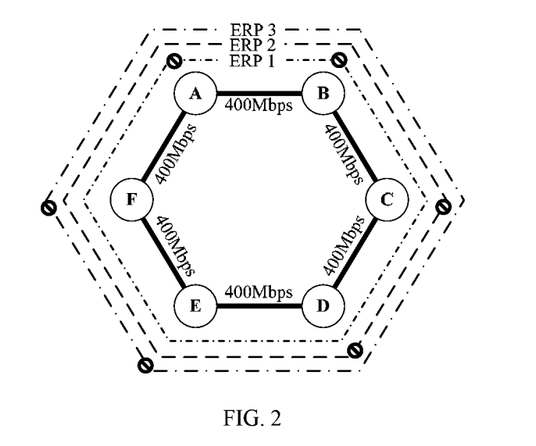
FIG. 2 is a schematic diagram of an Ethernet ring to which an Ethernet ring protection switching method applies according to another embodiment of the present disclosure.

To make the method provided in the embodiment of the present disclosure clearer, an Ethernet ring shown in FIG. 2 is taken as an example in the following. In FIG. 2, the Ethernet ring is formed by six nodes: a node A to a node F, bandwidth of each physical link is 400 Mbps (megabits/second), and the Ethernet ring is configured with three ERP instances: an ERP 1 instance, an ERP 2 instance, and an ERP 3 instance, where the three ERP instances have different RPLs: in the ERP 1 instance, an RPL is a link A↔B; in the ERP 2 instance, an RPL is a link C↔D; and in the ERP 3 instance, an RPL is a link E↔F. In a normal working status, the RPL of each ERP instance is in a blocked status, that is, ports of a node at any end of the RPL are blocked, where the ERP instance passes through the ports. It should be noted that RPL blocking may be single-end blocking and may also be dual-end blocking. A dual-end blocking manner is adopted in the Ethernet ring shown in FIG. 2.

The node A is taken as an example to describe a specific switching process. Correspondence between bandwidth information and switching information of each link on the Ethernet ring is pre-configured on the node A. In this embodiment, the switching information is embodied in a configuration of blocking positions of ports of the node A, where each ERP instance passes through the ports. As shown in Table 1 and Table 2, on the node A, switching information of a port of the node A is configured, where the port corresponds to an ERP instance passing through the link A↔B.

TABLE 1

Bandwidth Information Table

| Bandwidth Index | A↔B (Mbps) | B↔C (Mbps) | C↔D (Mbps) | D↔E (Mbps) | E↔F (Mbps) | F↔A (Mbps) |
| --- | --- | --- | --- | --- | --- | --- |
| B0 | 400 | 400 | 400 | 400 | 400 | 400 |
| B1 | 300 | 400 | 400 | 400 | 400 | 400 |
| B10 | 400 | 400 | 400 | 300 | 400 | 400 |
| B20 | 400 | 400 | 400 | 200 | 400 | 400 |
| B30 | 400 | 400 | 400 | 100 | 400 | 400 |
| B50 | 300 | 400 | 200 | 400 | 400 | 400 |
| ... | ... | ... | ... | ... | ... | ... |

TABLE 2

Switching Information Table

| Bandwidth Index | ERP1 | ERP2 | ERP3 |
| --- | --- | --- | --- |
| B0 | Open (Open) | Open (Open) | Open (Open) |
| B1 | Block (Block) | Open (Open) | Block (Block) |
| B10 | Open (Open) | Open (Open) | Open (Open) |
| B20 | Open (Open) | Open (Open) | Open (Open) |
| B30 | Open (Open) | Open (Open) | Open (Open) |
| B50 | Open (Open) | Block (Block) | Open (Open) |
| ... | ... | ... | ... |

In some embodiments, in switching information corresponding to each bandwidth index, only one blocked link is configured for each ERP instance, that is, a port of a node at one end or two ends of only one link of the ERP instance is blocked. For example, in a case corresponding to the bandwidth index B1, a port of the node A is blocked, where the port corresponds to the ERP 1 instance passing through the link A↔B, then in this case, except that a port of the node B may be optionally configured to be blocked, where the port corresponds to the ERP 1 instance passing through the link A↔B, none of other ports through which the ERP 1 instance passes should be configured to be blocked.

Assume that currently each ERP instance is working in a normal status, and in an initial status, the bandwidth of each link is 400 Mbps, and the port which is of the node A and corresponds to the link A↔B is open on the three ERP instances. When bandwidth degradation occurs to the link A↔B and the bandwidth decreases to 300 Mbps, a process in which the node A performs switching is as follows:

First, the node A has detected that bandwidth of the link A↔B decreases to 300 Mbps.

Then, by using bandwidth information of the link A↔B that has been detected in combination with bandwidth information of other links on the Ethernet ring that is stored on the node, the node A queries Table 1 and Table 2 to obtain that a bandwidth index in Table 1 that corresponds to the changed bandwidth of the link on the Ethernet ring is B1, and switching information in Table 2 that corresponds to B1 is to block the port of the node A, where the port corresponds to the ERP 1 instance passing through the link A↔B, to open the port of the node A, where the port corresponds to the ERP 2 instance passing through the link A↔B, and to block the port of the node A, where the port corresponds to the ERP 3 instance passing through the link A↔B.

Then, the node A performs the following operations according to the obtained switching information:

S11: For the ERP 1 instance: The node A blocks the port on the link A↔B, where the port corresponds to the ERP 1 instance passing through the link A↔B, and sends an R-APS protocol message on the ERP 1 instance, where the R-APS protocol message includes information that the port of the node A is blocked, where the port corresponds to the ERP 1 instance passing through the link A↔B. Other nodes receive the R-APS protocol message, and open ports of the other nodes, where the ERP 1 instance passes through the ports.

S12: For the ERP 2 instance: The node A receives an R-APS protocol message sent by the node D, where the R-APS protocol message includes information that a port of the node D is blocked, where the port corresponds to the ERP 2 instance passing through the link C↔D. The node A keeps the port on the link A↔B open, where the port corresponds to the ERP 2 instance passing through the link A↔B.

S13: For the ERP 3 instance: The node A blocks the port on the link A↔B, where the port corresponds to the ERP 3 instance passing through the link A↔B, and sends an R-APS protocol message on the ERP 3 instance, where the R-APS protocol message includes information that the port of the node A is blocked, where the port corresponds to the ERP 3 instance passing through the link A↔B. Other nodes receive the R-APS protocol message, and open ports of the other nodes, where the ERP 3 instance passes through the ports. Optionally, if the node B configures the blocked link A↔B in such a bandwidth situation, the node B also needs to block a corresponding port and does not need to open it.

Moreover, the node A further needs to update the bandwidth information which is of each link on the Ethernet ring and is stored on the node.

Figure 3:
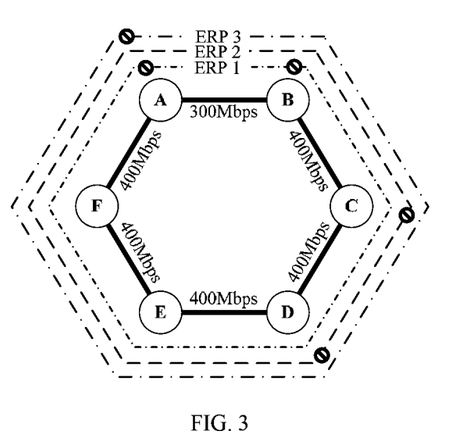
FIG. 3 is a schematic diagram of another Ethernet ring to which an Ethernet ring protection switching method applies according to another embodiment of the present disclosure.

In this way, as shown in FIG. 3, in the case in which each node on the Ethernet ring acquires that the bandwidth of the link A↔B decreases, switching information corresponding to the bandwidth information of each link on the Ethernet ring may be determined according to the correspondence between the bandwidth information and the switching information of each link on the Ethernet ring, so that each node on the Ethernet ring can perform, according to the switching information, a switching operation on a port corresponding to a designated link, where each of the three ERP instances passes through the port, thereby implementing Ethernet ring protection switching. Compared with a technology in the prior art that ring protection switching can only be triggered in a case of link failure or manual forced switching, the ring protection switching may be performed adaptively according to bandwidth of a link on the Ethernet ring and preset switching information. A link with high bandwidth is selected as a working link, which makes full use of an idle bandwidth on a backup link, improves utilization efficiency of a network bandwidth, and maximizes service capacity of the Ethernet ring.

Assume that the bandwidth of the link A↔B has decreased to 300 Mbps, and in this case, positions of blocked ports of the ERP 1 instance and the ERP 3 instance are both on the node A. When bandwidth degradation occurs to the link C↔D and a bandwidth decreases to 200 Mbps, a specific switching process of the node A is as follows:

First, the node C and/or the node D has detected that bandwidth of the link C↔D decreases to 200 Mbps, and then sends a bandwidth information packet, where the bandwidth information packet includes bandwidth information and link position information of the link C↔D, the bandwidth information packet may be an R-APS protocol message which carries the bandwidth information and the link position information in its protocol data unit, and the link position information may be represented by a combination of a node ID and a port number. In this way, the node A obtains the bandwidth information and the link position information that are included in the bandwidth information packet.

Then, by using the obtained bandwidth information of the link C↔D in combination with the bandwidth information of other links on the Ethernet ring that is stored on the node, the node A queries Table 1 and Table 2 to obtain that a bandwidth index in Table 1 that corresponds to the changed bandwidth of the link on the Ethernet ring is B50, and switching information in Table 2 that corresponds to B50 is to open the port of the node A, where the port corresponds to the ERP 1 instance passing through the link A↔B, to block the port of the node A, where the port corresponds to the ERP 2 instance passing through the link A↔B, and to open the port of the node A, where the port corresponds to the ERP 3 instance passing through the link A↔B.

Then, the node A performs the following operations according to the obtained switching information:

S21: For the ERP 1 instance: The node A receives an R-APS protocol message sent by the node D, where the R-APS protocol message includes information that a port of the node D is blocked, where the port corresponds to the ERP 1 instance passing through the link C↔D, and the node A opens the port on the link A↔B, where the port corresponds to the ERP 1 instance passing through the link A↔B.

S22: For the ERP 2 instance: The node A blocks the port on the link A↔B, where the port corresponds to the ERP 2 instance passing through the link A↔B, and sends an R-APS protocol message on the ERP 2 instance, where the R-APS protocol message includes information that the port of the node A is blocked, where the port corresponds to the ERP 2 instance passing through the link A↔B. Other nodes receive the R-APS protocol message, and open ports of the other nodes, where the ERP 2 instance passes through the port.

S23: For the ERP 3 instance: The node A receives an R-APS protocol message sent by the node D, where the R-APS protocol message includes information that a port on the link C↔D is blocked, where the port corresponds to the ERP 3 instance passing through the link C↔D. Then, the node A opens the port on the link A↔B, where the port corresponds to the ERP 3 instance passing through the link A↔B.

Moreover, the node A further needs to update the bandwidth information which is of each link on the Ethernet ring and is stored on the node.

Figure 4:
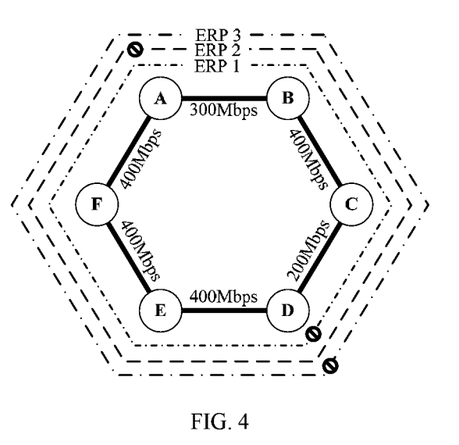
FIG. 4 is a schematic diagram of another Ethernet ring to which an Ethernet ring protection switching method applies according to another embodiment of the present disclosure.

In this way, as shown in FIG. 4, in the case in which each node on the Ethernet ring acquires that the bandwidth of the link C↔D decreases, switching information corresponding to the bandwidth information of each link on the Ethernet ring may be determined according to the correspondence between the bandwidth information and the switching information of each link on the Ethernet ring, so that each node on the Ethernet ring can perform, according to the switching information, a switching operation on a port corresponding to a designated link, where each of the three ERP instances passes through the port, thereby implementing Ethernet ring protection switching. Compared with a technology in the prior art that ring protection switching can only be triggered in a case of link failure or manual forced switching, the ring protection switching may be performed adaptively according to bandwidth of a link on the Ethernet ring and preset switching information. A link with high bandwidth is selected as a working link, which makes full use of an idle bandwidth on a backup link, improves utilization efficiency of a network bandwidth, and maximizes service capacity of the Ethernet ring.

Another embodiment of the present disclosure provides a computer program product, including computer program codes, where when a processing unit executes the computer program codes, the processing unit executes actions recorded in the foregoing Ethernet ring protection switching method.

It should be noted that, for ease of description, the foregoing method embodiments are all described as a series of action combinations. However, a person skilled in the art should understand that the present disclosure is not limited to the sequence of the described actions, because some steps may be performed in other sequences or performed at the same time according to the present disclosure. Moreover, a person skilled in the art should further understand that the embodiments described in the specification all belong to exemplary embodiments, and the involved actions and modules are not necessarily required by the present disclosure.

In the foregoing embodiments, the description of each embodiment has its emphasis, and for parts that are not described in detail in a certain embodiment, reference may be made to the relevant description of other embodiments.

Figure 5:
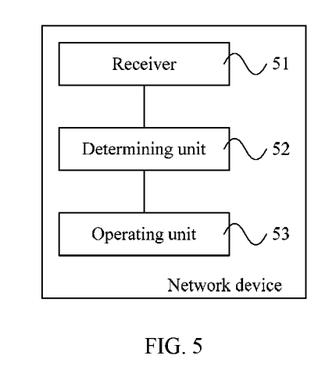
FIG. 5 is a schematic structural diagram of a network device according to another embodiment of the present disclosure.

FIG. 5 is a schematic structural diagram of a network device according to another embodiment of the present disclosure. As shown in FIG. 5, the network device in this embodiment may include a receiver 51, a determining unit 52 and an operating unit 53. The receiver 51 is configured to obtain bandwidth information of a first link on an Ethernet ring where the network device is located, where there is at least one ERP instance on the Ethernet ring; the determining unit 52 is configured to determine that bandwidth of the first link changes, and determine ports of the network device, where the at least one ERP instance passes through the ports; and the operating unit 53 is configured to query pre-configured correspondence between bandwidth information and switching information of each link on the Ethernet ring, and execute, through the ports of the network device, a switching operation corresponding to the bandwidth information of the first link.

Figure 6:
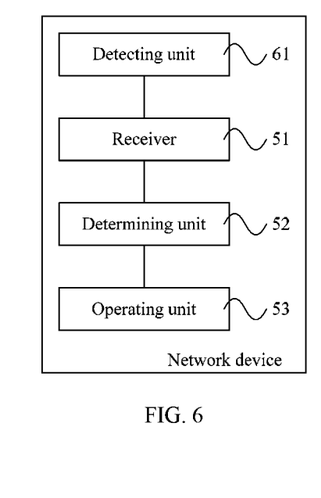
FIG. 6 is a schematic structural diagram of a network device according to another embodiment of the present disclosure.

Optionally, in an optional implementation of this embodiment, the network device is an end network device of the first link. As shown in FIG. 6, the network device provided in this embodiment further includes a detecting unit 61, configured to detect the bandwidth of the first link.

Optionally, in an optional implementation of this embodiment, the network device is an end network device of the first link. The receiver 51 may further receive a bandwidth information packet sent by the end network device of the first link, where the bandwidth information packet carries the bandwidth information of the first link.

Figure 7:
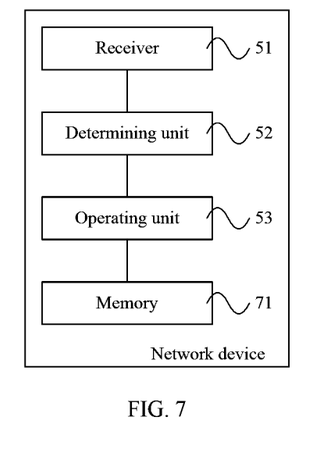
FIG. 7 is a schematic structural diagram of a network device according to another embodiment of the present disclosure.

Optionally, in an optional implementation of this embodiment, as shown in FIG. 7, the network device provided in this embodiment further includes a memory 71, configured to store the correspondence between the bandwidth information and the switching information of each link on the Ethernet ring, where the correspondence between the bandwidth information and the switching information of each link on the Ethernet ring includes:

correspondence between a bandwidth value and a bandwidth index of each link on the Ethernet ring;

correspondence between the bandwidth index and the at least one ERP instance; and correspondence between the at least one ERP instance and a switching operation that needs to be executed through the ports of the network device.

In this embodiment, in the network device, the receiver obtains the bandwidth information of the first link on the Ethernet ring where the network device is located, and the determining unit determines that the bandwidth of the first link changes, where there is at least one ERP instance on the Ethernet ring, and further determines the ports of the network device, where the at least one ERP instance passes through the ports, so that the operating unit can query the pre-configured correspondence between the bandwidth information and the switching information of each link on the Ethernet ring, and perform, through the ports of the network device, the switching operation corresponding to the bandwidth information of the first link. The receiver obtains bandwidth information of each link on the Ethernet ring where the network device is located, where there is at least one ERP instance configured in a ring network, an acquiring unit acquires, according to the bandwidth information, that bandwidth of a link on the Ethernet ring changes, and then the determining unit determines, according to the pre-configured correspondence between the bandwidth information and the switching information of each link on the Ethernet ring, switching information corresponding to the bandwidth information, so that the operating unit can perform, according to the switching information, a switching operation on ports which participate in the at least one ERP instance and are on the network device, which can solve a problem in the prior art that ring protection switching can only be triggered in a case of link failure or manual forced switching, thereby improving flexibility of ring protection switching. By adopting the technical solution provided in the present disclosure, if bandwidth of a link on the Ethernet ring changes, a backup link with a higher bandwidth can be used for data transmission, which can effectively ensure that service capacity of the Ethernet ring is maximized.

Another embodiment of the present disclosure further provides an Ethernet ring protection switching system, which may include the network device provided in the embodiment corresponding to FIG. 5, FIG. 6, or FIG. 7, and further includes another network device, configured to send a bandwidth information packet to the network device, where the bandwidth information packet carries the bandwidth information of the first link.

A person skilled in the art may clearly understand that, for the purpose of convenient and brief description, for a specific working process of the system, apparatus, and unit described in the foregoing, reference may be made to a corresponding process in the foregoing method embodiments, which is not repeatedly described here.

In the several embodiments provided in the present application, it should be understood that the disclosed system, apparatus, and method may be implemented in other manners. For example, the apparatus embodiment described in the foregoing is merely exemplary. For example, dividing of the units is merely a type of logical function dividing, and there may be other dividing manners during actual implementation. For example, multiple units or components may be combined or integrated into another system, or some features may be ignored or not executed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Part of or all of the units may be selected according to the actual needs to achieve the objectives of the solutions of the embodiments.

In addition, functional units in the embodiments of the present disclosure may be integrated into a processing unit, or each of the units may exist alone physically, or two or more units are integrated into a unit. The integrated unit may be implemented through hardware, or may also be implemented in a form of hardware plus a software functional module.

The integrated unit implemented in the form of software functional unit may be stored in a computer readable storage medium. The software functional unit is stored in a storage medium, and includes several instructions used to instruct a computer device (for example, a personal computer, a server, or a network device) to execute part of the steps of the methods according to the embodiments of the present disclosure. The storage medium includes any medium that is capable of storing program codes, such as a U disk, a removable hard disk, a read-only memory (Read-Only memory, ROM for short), a random access memory (Random Access Memory, RAM for short), a magnetic disk, or a compact disk.

Finally, it should be noted that, the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to part of the technical features; however, these modifications or substitutions do not make the essence of the corresponding technical solutions depart from the spirit and scope of the technical solutions of the embodiments of the present disclosure.

What is claimed is:

1. An Ethernet ring protection switching method, comprising:
   obtaining, by a node, bandwidth information of a first link on an Ethernet ring on which the node is located, and determining that bandwidth of the first link changes, wherein there is at least one Ethernet ring protection instance on the Ethernet ring;
   determining, by the node, ports of the node, wherein the at least one Ethernet ring protection instance passes through the ports; and
   querying, by the node, pre-configured correspondence between bandwidth information and switching information of each link on the Ethernet ring, and executing, through the ports of the node, a switching operation corresponding to the bandwidth information of the first link,
   wherein the node stores the correspondence between the bandwidth information and the switching information of each link on the Ethernet ring, and the correspondence between the bandwidth information and the switching information of each link on the Ethernet ring comprises:
   correspondence between a bandwidth value and at the least one Ethernet ring protection instance and a switching operation that needs to be executed through the ports of the node.

2. The method according to claim 1, wherein the node is an end node of the first link, and before the node obtains the bandwidth information of each link on the Ethernet ring where the node is located, the method further comprises:
   detecting, by the node, the bandwidth of the first link.

3. The method according to claim 1, wherein before the node obtains the bandwidth information of each link on the Ethernet ring where the node is located, the method further comprises:
   receiving, by the node, a bandwidth information packet sent by an end node of the first link, wherein the bandwidth information packet carries the bandwidth information of the first link.

4. A non-transitory computer program product comprising computer program codes stored therein, such that when a processing unit executes the computer program codes, the processing unit executes actions comprising:
   obtaining, by a node, bandwidth information of a first link on an Ethernet ring on which the node is located, and determining that bandwidth of the first link changes, wherein there is at least one Ethernet ring protection instance on the Ethernet ring;
   determining, by the node, ports of the node, wherein the at least one Ethernet ring protection instance passes through the ports; and
   querying, by the node, pre-configured correspondence between bandwidth information and switching information of each link on the Ethernet ring, and executing, through the ports of the node, a switching operation corresponding to the bandwidth information of the first link,
   wherein the node stores the correspondence between the bandwidth information and the switching information of each link on the Ethernet ring, and the correspondence between the bandwidth information and the switching information of each link on the Ethernet ring comprises:
   correspondence between a bandwidth value and the at least one Ethernet ring protection instance and a switching operation that needs to be executed through the ports of the node.

5. A network device, comprising:
   a receiver, configured to obtain bandwidth information of a first link on an Ethernet ring on which the network device is located, wherein there is at least one Ethernet ring protection instance on the Ethernet ring;
   a processor configured to:
   determine that bandwidth of the first link changes, and determine ports of the network device, wherein the at least one Ethernet ring protection instance passes through the ports, and
   query pre-configured correspondence between bandwidth information and switching information of each link on the Ethernet ring, and execute, through the ports of the network device, a switching operation corresponding to the bandwidth information of the first link; and
   a memory that stores the correspondence between the bandwidth information and the switching information of each link on the Ethernet ring, wherein the correspondence between the bandwidth information and the switching information of each link on the Ethernet ring comprises:
   correspondence between a bandwidth value and the at least one Ethernet ring protection instance and a switching operation that needs to be executed through the ports of the network device.

6. The network device according to claim 5, wherein the network device is an end network device of the first link, and wherein the processor is further configured to detect the bandwidth of the first link.

7. The network device according to claim 5, wherein the receiver is further configured to:
   receive a bandwidth information packet sent by an end network device of the first link, wherein the bandwidth information packet carries the bandwidth information of the first link.

8. An Ethernet ring protection switching system, comprising:
   a first network device that includes:
   a receiver, configured to obtain bandwidth information of a first link on an Ethernet ring on which the first network device is located, wherein there is at least one Ethernet ring protection instance on the Ethernet ring,
   a processor configured to:
   determine that bandwidth of the first link changes, and determine ports of the first network device, wherein the at least one Ethernet ring protection instance passes through the ports, and
   query pre-configured correspondence between bandwidth information and switching information of each link on the Ethernet ring, and execute, through the ports of the first network device, a switching operation corresponding to the bandwidth information of the first link, and
   a memory that stores the correspondence between the bandwidth information and the switching information of each link on the Ethernet ring, wherein the correspondence between the bandwidth information and the switching information of each link on the Ethernet ring comprises:

correspondence between a bandwidth value and the at least one Ethernet ring protection instance and a switching operation that needs to be executed through the ports of the network device; and a second network device, configured to send a bandwidth information packet to the first network device, wherein the bandwidth information packet carries the bandwidth information of the first link.

\* \* \* \* \*